Patented May 31, 1949

2,471,853

UNITED STATES PATENT OFFICE 2,471,853

CATALYTIC PARTIAL OXIDATION PROCESS

Leland K. Beach, Mountainside, and Gerald C. Connolly, Elizabeth, N. J., assignors to Standard Oil Development Company, a corporation of Delaware No Drawing. Application February 5, 1946, Serial No. 645,714

8 Claims. (Cl. 260—342)

This invention relates to the manufacture of oxygenated organic compounds, such as phthalic anhydride. It is concerned with adapting a catalyst for use with fluid catalyst techniques in a partial oxidation of vaporized hydrocarbons and similar reactions.

In a fluid catalyst process finely-divided or powdered catalytic material (of about 10 to 300 mesh or finer) is suspended in a moving stream of gaseous reactants, usually passed upwardly through a reaction zone. The suspended solid particles of catalytic material are in a turbulent, mobile or fluidized state within the reaction zone, making effective contact with the reactants. Introduced into the reaction zone continuously and in regulated concentration at an adjusted temperature, the particles absorb and remove heat produced by the reaction, giving good temperature control and more uniform reaction conditions. Without requiring shutdown or mechanical moving parts, the suspended particles may be withdrawn in a fluidized state from the reaction zone to be separated from reactants and products, then be regenerated, if necessary, adjusted in temperature and recycled in a fluidized state to the reaction zone continuously. Various methods and kinds of apparatus may be used with this technique, but they are not part of this invention and, therefore, will not be described in detail.

A number of technical advantages are offered by the fluid catalyst techniques over fixed bed processes if an efficient fluidized catalyst is employed.

The conventional fixed bed catalytic materials are unsuitable for a fluid catalyst process. Some of them cannot be properly suspended. Others are too fragile and become rapidly disintegrated under grinding action encountered in a fluid catalyst process. Impregnated gels, such as obtained when silica gel is impregnated with a catalyst and dried, are among the more rugged materials but unfortunately the sorptive nature of the gel supports leads to high combustion of the organic reactants.

An object of this invention is to provide a suitably rugged and efficient catalytic material for use with fluid catalyst technique in partial oxidation reactions of organic compounds.

More specifically, it is an object of this invention to provide in a partial oxidation process a catalyst impregnated adsorbent, such as an inorganic gel, modified in its sorptive capacity to avoid undue combustion of the organic reactant.

A further object is to provide proper conditions for preparing and using a catalytic material adapted for a fluid catalyst partial oxidation process.

To further explain the invention, application of the fluid catalyst technique with the improved catalytic material in the production of phthalic anhydride by partial oxidation of naphthalene or of o-xylene will be mainly considered. Naphthalene is reacted best with substantially the same conditions and catalysts as o-xylene. O-xylene gives roughly parallel results to those obtained with naphthalene but at a lower yield level. Phthalic anhydride production is of principal interest because it is required on a large industrial scale.

The partial oxidation of a hydrocarbon reactant in vapor phase is highly exothermic, and it is important to avoid any substantial rise in temperature at any point in the reaction zone to above an optimum reaction temperature, otherwise the oxidation goes too far, the hydrocarbon reactant then undergoing combustion. Prolonged contact of the hydrocarbon reactant and oxygenated product with the catalyst results in excessive oxidation and poor yields, also. Thus, the reaction variables having most effect on yields are contact time and temperature. The optimum temperature and contact time can be determined and satisfactorily maintained for a catalytic material which resists disintegration, has a homogeneous composition, and does not tend to retain the reactant or product for excessive reaction.

Solid inorganic adsorbents characterized by high dehydrating capacity and homogeneous composition are capable of being homogeneously impregnated with metal oxide catalysts to form rugged, homogeneous catalytic materials even when ground to any small dimension. The solid inorganic gels, such as silica and alumina gels, are adsorbents of this type. They are porous granular substances which selectively adsorb and absorb gases and vapors. The general term sorption is used to describe both actions of collecting gases and vapors on the surfaces and in the pores of these solids.

It is now found that by adequately heating the gels or adsorbents, before or after impregnation, the resulting catalytic material is rugged, homogeneous, and more efficient even though the temperature of this heat treatment is above the normal fusing temperature of the preferred metal oxide catalyst, vanadium oxides.

For adequate heat treatment, the adsorbent or gel should be heated to above 700° C. and preferably to a temperature in the range of 800° C. to 1200° C. The time of heating may be varied, but generally up to about three hours is sufficient. The extent of improvement by the heat treatment is correlated to the temperature rather than to the time. Marked improvement becomes evident as the temperature is increased to above 700° C. and above 800° C.

By the high temperature heat treatment, the adsorbents practically lose their sorption capacity for the organic vapors in the reaction, or at least do not retain these vapors for excessive oxidation while the activity of the catalyst is maintained at a high level. Without being bound by any theory on the fundamental action of the heat treatment, it may be said that the sorption capacity of the adsorbent is practically eliminated through a closing or shrinking of the pores of the adsorbent. Also, the adsorbent may be considered as being deactivated so that it does not interfere with the selectivity of the catalyst proper.

The best commercial fixed bed catalytic materials have a brittle coating of catalyst on a hard base, such as corundum. Attempts were made to strengthen the catalyst layer by moderate fusion, but the fusion resulted in lower yields of phthalic anhydride. There was a loss in selectivity which may be attributed to accumulation of impurities in the catalyst and decrease in active surface, which generally accompanies fusing or sintering of a catalyst.

Pure vanadium pentoxide when fused moderately to avoid destroying its activity crumbled badly.

Improvement by high temperature heat treatment is made in various suitable adsorbents, such as silica gel, alumina gel, and mixtures of the gels impregnated with various metal oxide catalysts and impregnated by various methods, but best results in phthalic anhydride production were obtained with a heat-treated silica adsorbent containing vanadium pentoxide.

The catalyst content of the adsorbent has a bearing on the heat treatment. Optimum yields of phthalic anhydride are obtained under optimum conditions with a heat-treated gel containing from about 10% to 40% by weight of $V_2O_5$. By heat treating silica gel containing 10% $V_2O_5$ at 1000° C. the anhydride yield is approximately double the yield obtained with this catalytic material heat treated at 540° C. and used under comparative conditions for optimum partial oxidation of o-xylene. A silica gel containing 30% $V_2O_5$ need be heat treated at only 870° C. to give as high a yield as obtained with the gel containing 10% $V_2O_5$ and heat treated at 1000° C. Thus, in general, a relatively higher temperature of heat treatment appears desirable when the adsorbents have relatively lower catalyst contents.

As a general rule, impurities are indicated to be harmful in the heat-treated adsorbents, particularly in $V_2O_5$ impregnated silica. Even alkali oxides, e. g., $K_2O$, which are used in fixed bed catalysts as promoters tend to have a poisoning effect in the silica adsorbent, especially in concentrations above about 0.1% by weight. Accordingly, homogeneous pure gels are most reliable. Although $MoO_3$ has been regarded generally as a good catalyst for partial oxidation, it is not efficient in a heat-treated silica gel for phthalic anhydride formation.

Using the principles explained, a large number of catalytic materials were prepared for comparing their efficiencies and suitabilities in a fluid catalyst process.

For impregnating the adsorbents or gels, the adsorbents in various initial forms were treated by various methods. Dried silica gel and silica hydrogel, for example, were mulled with a $V_2O_5$ slurry, impregnated and mulled with $NH_4VO_3$, impregnated with vanadyl sulfate, impregnated with vanadium oxychloride followed by hydrolysis of the oxychloride. Gelatinous alumina, alumina hydrate, and activated alumina were similarly treated. Generally, the adsorbent was homogenized in a ball mill during impregnation and after impregnating was dried, sized, and heat treated.

A preferred method and one most satisfactory for making the most effective and homogeneous catalysts suitable for fluid-flow and related types of operation was to impregnate, or otherwise mix, the active ingredient ($V_2O_5$, $NH_4VO_3$, etc.) with the adsorbent carrier while the adsorbent was in the purified jelly or hydrogel form. For example, a silica hydrogel was prepared by adding a 25 Bé. solution of sodium silicate to a 23 Bé. solution of sulfuric acid to form a clear silica hydrosol which set to a clear vibrant hydrogel in approximately three to five hours. This hydrogel was broken up into lumps and washed with water until virtually free of all reaction bodies. A given weight of the purified silica hydrogel was placed in a ball-mill, a slurry of $V_2O_5$ or a solution of $NH_4VO_3$ added and the whole was mulled for a period of hours or until the mass was quite homogeneous. The thick sol-like mass, discharged from the muller, was then dried slowly at about 100° C. The granules obtained were ground and sized to mesh and finally heated slowly to the temperature desired, say 870° C., and held at this temperature for approximately three hours. The resultant catalyst was quite uniform in structure as was evidenced by the fact that particles of various mesh size carried the same concentrations of $V_2O_5$.

When gelatinous alumina was used for the adsorbent carrier the procedure was essentially the same as when using a silica hydrogel. The gelatinous alumina was prepared by any suitable means as by reacting solutions of aluminum sulfate and ammonium hydroxide until a gelatinous alumina was formed and the reaction mass was definitely alkaline. This gelatinous alumina was washed with water until free of reaction salts and formed the starting point for impregnating or mixing with the active vanadium component.

Vapor phase oxidation of o-xylene or naphthalene is carried out with oxygen present in air as the oxidizing reactant. Steam dilution does not significantly affect the maximum total acid yield but apparently requires somewhat higher reaction temperatures. Other diluents such as carbon dioxide or nitrogen may be used. Generally, the feed may contain the oxidizing gas or diluted gas with about 0.5 to 3 volume per cent of the hydrocarbon reactant vapor to be partially oxidized.

The size of solid particles of catalytic material may be varied depending upon the type of fluid process to be used, and velocity of the gaseous reaction mixture in obtaining suspension of the particles on a boiling bed or jiggler process, about 30 to 60 mesh particles may be used. For a process in which the catalyst is circulated through the reaction zone, the particle size generally suitable is about 100 to 300 mesh. The velocity of the gaseous reaction mixture may be of the order of 0.1 to 10 feet per second. The pressure in the reaction zone may vary from atmospheric pressure.

As already mentioned, the important variables are contact time and temperature, hence the feed rate and proportion of catalyst are to be adjusted to obtain the proper contact time.

With the efficient catalysts, the optimum contact time is short, only about 0.05 to 0.5 second, and the optimum contact temperatures are usually within the range of 400° C. to 550° C. Catalysts which require longer contact times, such as 1 to 8 seconds, give substantially lower maximum yields even at their optimum reaction temperatures in the range of 350° C. to 400° C. Similarly, if the efficient catalysts are used at a lower than optimum temperature for short contact time, they require a longer contact time for a maximum yield which is substantially lower than the yield they give at their optimum temperature with short contact time.

The following tabulated data illustrate a study by which proper conditions for preparing and using the catalyst-impregnated adsorbents are demonstrated.

RELATION OF CATALYTIC ACTIVITY TO COMPOSITION AND HEAT TREATMENT

*Effects of temperature and contact time*

[Conditions: About 1 mole per cent of 88 per cent o-xylene in feed gas.]

| Catalytic Material | | Heat Treatment Temp., °C. | Contact Time, Seconds | Optimum Minimum Reaction Temperature, °C. | Maximum Mole per cent Acid on Feed |
|---|---|---|---|---|---|
| Wt. per cent on $V_2O_5$ | Adsorbent | | | | |
| 10 | Silica | 1,000 | 0.2 | 465 | 59 |
| 10 | ...do | 870 | 0.2 | 455 | 48 |
| 30 | ...do | 870 | 1 0.1 | 460 | 66 |
| 30 | ...do | 1,000 | 0.2 | 430 | 60 |
| 30 | ...do | 870 | 0.2 | 435 | 64 |
| 30 | ...do | 760 | 0.2 | 435 | 60 |
| 30 | ...do | 540 | 0.2 | <390 | 39 |
| 40 | ...do | 870 | 0.2 | 440 | 59 |
| 40 | ...do | 1,000 | 0.2 | 440 | 60 |
| 10 | Alumina | 870 | 0.2 | 360 | 47 |
| 2 20 | ...do | 1,000 | 0.2 | 475 | 47 |
| 3 20 | ...do | 1,000 | 0.2 | 400 | 62 |
| 20 | ...do | 870 | 0.2 | 425 | 58 |
| 20 | ...do | 760 | 0.2 | 425 | 50 |
| 20 | ...do | 540 | 0.2 | 310 | 25 |
| 30 | ...do | 870 | 0.2 | 390 | 56 |
| 30 | Silica | 870 | 4.0 | 390 | 44 |

1 Steam dilution.
2 From $V_2O_5$ Slurry.
3 From $NH_4VO_3$ solution.

The data summarized in the table are duplicated by a large number of other runs including runs in which naphthalene is reacted to give parallel but somewhat higher yields. The optimum minimum reaction temperature is defined as the temperature measured in the reaction zone near the inlet. Some increase in temperature tends to occur within the reaction zone. But this increase is moderated when the process is carried out efficiently. The optimum minimum temperature is obtained from a series of runs at varied temperatures with a given catalyst in a fixed contact time and is the temperature at which a maximum yield is obtained, other conditions being constant.

The tabulated data illustrate the effects of several factors: (1) optimum content of about 30 weight per cent of $V_2O_5$ in the heat-treated silica absorbent; (2) optimum heat-treating temperature of about 870° to 1000° C.; (3) optimum content of about 20 weight per cent $V_2O_5$ in the heat-treated alumina absorbent; (4) improvement by the heat treatment at temperatures above 700° C.; and (5) improvement of yield by use of a short contact time at temperatures above about 400° C. Other variables, such as catalyst preparation and density, are involved in this table.

Some of the best commercial fixed bed catalysts under optimum fixed bed process conditions have given maximum yields as high as 65 mole per cent of feed reactant to acid in conversion of 88% o-xylene, but, of course, such catalysts are unsuitable for use with fluid technique.

The following representative examples illustrate how the catalyst impregnated absorbent adapted for a fluid catalyst process by adequate heat treatment gives excellent results compared to a fixed bed catalyst and how the shortened contact time (high feed velocity) gives increased yields.

*Example 1*

A rugged catalytic material adapted for fluidizing was prepared by mulling in a ball mill a purified silica hydrogel (apparent density 0.691) with $NH_4VO_3$ solution (C. P. grade), drying, sizing, then heat treating at 870° C. for 3 hours. The heat-treated gel contained about 30 weight per cent $V_2O_5$ and had a final apparent density of 0.81.

A feed stream containing 0.99 volume per cent naphthalene vapor and 40 volume per cent steam in air was heated to about 460° C. and passed through a reaction zone at sufficient velocity to give a short contact time of 0.1 second with particles of the heat treated catalytic material.

Gaseous reaction products from the reaction zone were separated from the catalyst and phthalic anhydride was condensed.

The maximum molar yield of phthalic anhydride recovered was 77% based on pure naphalene in the feed.

*Example 2*

Using one of the best commercial fixed bed catalysts of about 1.8 density under optimum conditions for fixed bed operation on the same feed as used in Example 1, the maximum molar yield of phthalic anhydride recovered was only 72% based on pure naphthalene in the feed, the same volume of catalytic material being used.

*Example 3*

Using the catalyst prepared as described in Example 1 at optimum temperature of 370° C. for a longer contact time of 4 seconds with the feed, but without steam dilution, the maximum molar yield of phthalic anhydride based on pure naphthalene in the feed dropped to 65%.

It will be understood that the foregoing examples are intended solely for illustrative purposes. The solid catalytic materials may be separated from the reaction products, may be cooled, and introduced into the reaction zone by various means to bring about gaseous suspension of the solid catalytic particles.

One remarkable feature of the present invention demonstrated by the above examples is the attainment of high selectivity with catalyst-impregnated, heat-treated gels having relatively low densities (e. g., 0.4 to 0.8) as compared to commercial fixed bed catalytic materials which generally have had densities substantially above 1. This feature is advantageous, economically, in permitting the use of much lower weight of catalytic material. The weight of the catalytic material used in Example 1, for instance, is about one-third the weight of the fixed bed type catalytic material used in Example 2, yet a higher yield of phthalic anhydride is obtained with the lower density catalytic material of Example 1.

The present invention may be applied quite generally in exothermic partial oxidation reaction. For example, it may also be used in a catalytic partial oxidation of benzene or other aromatics to form fumaric acid, maleic anhydride, and other specific partially oxygenated compounds.

We claim:

1. In a selective partial oxidation reaction, the improvement which comprises contacting an aromatic hydrocarbon with solid particles of a catalyst-impregnated hydrous oxide gel adsorbent heat treated at a temperature above 700° C. to have a substantially reduced sorptive capacity for the aromatic hydrocarbon.

2. In a fluid catalyst partial oxidation process, the improvement which comprises heat treating at a temperature above 700° C. an anhydrous oxide gel adsorbent which has a high sorptive capacity for an aromatic hydrocarbon in the process to render the adsorbent practically nonsorptive, and suspending particles of the thus-treated adsorbent impregnated with a catalyst in a gaseous reaction stream containing the aromatic hydrocarbon.

3. In a catalytic partial oxidation of an aromatic hydrocarbon, the improvement which comprises heat treating solid particles of an inorganic hydrous oxide gel adsorbent at a temperature above 700° C. until the adsorbent is rendered practically non-sorptive, and contacting vapors of the aromatic hydrocarbon in a stream of an oxidizing gas with solid particles of the heat-treated adsorbent impregnated with a metal oxide catalyst.

4. In the production of phthalic anhydride from an aromatic hydrocarbon, the improvement which comprises heat treating at a temperature between 700° C. and 1200° C. an inorganic hydrous oxide gel adsorbent impregnated with a metal oxide oxidation catalyst, and contacting vapor of the aromatic hydrocarbon with the heat-treated adsorbent impregnated with the catalyst in a stream of air mixed with steam.

5. In a catalytic partial oxidation of naphthalene to phthalic anhydride, the improvement which comprises heat treating solid inorganic hydrous oxide gel adsorbent particles for a period of about 3 hours at a temperature in the range 800° C. to 1200° C., and contacting vapor of naphthalene in an oxidizing gas stream with solid particles of the heat-treated adsorbent particles containing vanadium pentoxide.

6. In the production of phthalic anhydride from an aromatic hydrocarbon by partial oxidation, the improvement which comprises heating silica gel adsorbent particles impregnated with vanadium pentoxide to a temperature in the range 800° C. to 1200° C., and suspending the resulting particles at a temperature above 350° C. in a gaseous feed stream of the aromatic hydrocarbon mixed with air.

7. The method of partially oxidizing naphthalene to phthalic anhydride, which comprises impregnating an alumina gel adsorbent with about 20 weight per cent of vanadium pentoxide, heat treating the impregnated adsorbent at a temperature in the range of about 800° C. and 1200° C. until the adsorbent loses its sorptive capacity, and partially oxidizing naphthalene vapor in an oxidizing gas stream at an optimum reaction temperature between 400° C. and 550° C. in a short contact time of 0.05 to 0.5 second with suspended particles of the impregnated adsorbent modified in sorptive capacity.

8. The method of partially oxidizing naphthalene to phthalic anhydride which comprises heating silica gel impregnated with about 30% of vanadium pentoxide to a temperature of about 870° C., and partially oxidizing naphthalene vapor in an oxidizing gas stream at an optimum reaction temperature between 400° C. and 550° C. in a short contact time of 0.05 to 0.5 second with suspended particles of the impregnated adsorbent modified by the heating.

LELAND K. BEACH.
GERALD C. CONNOLLY.

REFERENCES CITED

The following references are of record in the file of this patent:

UNITED STATES PATENTS

| Number | Name | Date |
|---|---|---|
| 2,027,316 | Johnson | Jan. 7, 1936 |
| 2,142,678 | Porter | Jan. 3, 1939 |
| 2,180,353 | Foster | Nov. 21, 1939 |
| 2,229,361 | Bertsch | Jan. 21, 1941 |
| 2,319,452 | Grosse | May 18, 1943 |
| 2,373,008 | Becker | Apr. 3, 1945 |
| 2,395,836 | Bates | Mar. 5, 1946 |
| 2,398,899 | Teter | Apr. 23, 1946 |
| 2,423,947 | Pitzer | July 15, 1947 |
| 2,437,533 | Huffman | Mar. 9, 1948 |